United States Patent [19]

Akesson et al.

[11] Patent Number: 4,868,951
[45] Date of Patent: Sep. 26, 1989

[54] CUTTING OF MATERIAL FOR OBTAINING A PORTION OF PREDETERMINED WEIGHT

[75] Inventors: Yngve R. Akesson, S-Halsingborg; Nils E. Hansson, Bjuv; Mats Olofsson, Astorp; Guiliano Pegoraro, Bjuv, all of Sweden

[73] Assignee: Nestec S.A., Vevey, Switzerland

[21] Appl. No.: 271,167

[22] Filed: Nov. 14, 1988

Related U.S. Application Data

[63] Continuation-in-part of Ser. No. 12,334, Feb. 9, 1987, abandoned, and a continuation-in-part of Ser. No. 114,231, Oct. 27, 1987, abandoned, and a continuation-in-part of Ser. No. 121,922, Nov. 18, 1987, abandoned, and a continuation-in-part of Ser. No. 178,488, Apr. 7, 1988, abandoned, and a continuation-in-part of Ser. No. 178,523, Apr. 7, 1988, abandoned, and a continuation-in-part of Ser. No. 225,568, Jul. 26, 1988, abandoned.

[30] Foreign Application Priority Data

| Mar. 1, 1986 | [EP] | European Pat. Off. | 86102704.3 |
| Nov. 11, 1986 | [EP] | European Pat. Off. | 86115182.7 |
| Dec. 6, 1986 | [EP] | European Pat. Off. | 86116970.4 |
| Apr. 18, 1987 | [EP] | European Pat. Off. | 87105778.2 |
| Apr. 29, 1987 | [EP] | European Pat. Off. | 87106205.5 |

[51] Int. Cl.$^4$ ............................................. A22C 25/06
[52] U.S. Cl. ........................................ 17/54; 17/52; 83/367; 83/370
[58] Field of Search ................. 17/54, 52, 45, 61; 83/360, 370, 367

[56] References Cited

U.S. PATENT DOCUMENTS

| 3,993,148 | 11/1976 | Keser et al. . |
| 3,995,517 | 12/1976 | Smith . |
| 4,065,911 | 1/1978 | Fagan . |
| 4,136,504 | 1/1979 | Wyslotsky . |
| 4,136,749 | 1/1979 | Di Rosa . |
| 4,214,640 | 1/1980 | Di Rosa . |
| 4,441,537 | 4/1984 | Vartiainen . |
| 4,557,019 | 12/1985 | Van Devanter et al. ............... 17/54 |
| 4,562,917 | 1/1986 | Suzuki et al. . |
| 4,598,618 | 7/1986 | Kuchlek . |
| 4,603,610 | 8/1986 | Whitehouse . |
| 4,718,146 | 1/1987 | Adkison . |
| 4,763,738 | 8/1988 | Kuchler . |

FOREIGN PATENT DOCUMENTS

2128141 10/1972 France .

Primary Examiner—Willis Little
Attorney, Agent, or Firm—Vogt & O'Donnell

[57] ABSTRACT

Automatic cutting of pieces of material for obtaining a cut portion having a predetermined weight is performed by an apparatus and process in which the pieces to be cut are first weighed and then cut to obtain a portion having a predetermined weight. The pieces to be cut are transported on adjacent parallel conveyors adapted to travel in the same direction at substantially the same speed, a portion of each piece being transported on each conveyor. At least one of the conveyors includes at least one load-bearing platform, each load-bearing platform being associated with a weighing machine for performing, at least once, weighing of at least a portion of each piece to be cut at least once. After weighing, the pieces then may be moved transversely relative to the direction of travel of the conveyors for positioning the pieces for cutting by a cutting device which receives the transported pieces from the conveyors and then cuts them parallel to their direction of travel for obtaining a cut portion having the predetermined weight. Alternatively, the cutting device is moved transversely for cutting for obtaining a cut portion having the predetermined weight. A control device provides for controlling movement of the means for moving the pieces transversely and for controlling movement and positioning of the cutting device with respect to the weights determined.

37 Claims, 6 Drawing Sheets

CUTTING OF MATERIAL FOR OBTAINING A PORTION OF PREDETERMINED WEIGHT

CROSS REFERENCE TO RELATED APPLICATIONS

This application is a continuation-in-part application of Ser. Nos. 07/012,334 filed Feb. 9, 1987; 07/114,231 filed Oct. 27, 1987; 07/121,922 filed Nov. 18, 1987; 07/178,488 filed Apr. 7, 1988; 07/178,523 filed Apr. 7, 1988; and 07/225,568 filed July 26, 1988, all now abandoned.

BACKGROUND OF THE INVENTION

The present invention relates to an apparatus and a process for the automatic cutting of materials, particularly meat or fish, to produce portions of a predetermined constant weight.

In the production of packaged frozen meat or fish products, it is important that the weight of the portions is controlled as accurately as possible, otherwise the weights will vary at the time of filling the packages resulting in certain disadvantages. For example, underweight portions of incorrect weight have to be rejected leading to significant losses of fish or meat material while overweight portions have to be adjusted to the correct weight, which increases the costs.

The most reliable way of ensuring a constant weight is by cutting and weighing the portions manually. However, this is labour intensive and very time-consuming. Mechanical means for automatic and semi-automatic cutting and weighing of portions have been described, but these generally involve the use of very complex machinery. For example, the use of photoelectric sensors has been proposed to detect the linear measurements of fish, but since not only the length, but also the breadth and thickness vary appreciably, this method would not lead to the cutting of portions with an accurate constant weight.

SUMMARY OF THE INVENTION

We have now developed an extremely simple apparatus and method which, surprisingly, enables portions to be cut automatically having a predetermined constant weight. This method provides labour savings when compared with manual methods and there is no loss in yield owing to underweight portions having to be rejected.

Accordingly, the present invention provides an apparatus and process for the automatic cutting of pieces of a material for obtaining portions of a predetermined weight, comprising at least one weighing machine, a control device, a fixed or movable cutting device positioned downstream of the weighing machine and at least two adjacent parallel conveyors suitable for transporting pieces of material to be cut and adapted to travel in the same direction at substantially the same speed and that at least part of at least one of the parallel conveyors is adapted to form the load-bearing platform of a weighing machine, the weighing machine being adapted to weigh the material on the load-bearing platform and the cutting device, when movable, being adapted to move transversely relative to the direction of movement of the conveyors, and when fixed there being provided means, positioned between the weighing machine and the cutting device, for causing the material to move transversely relative to the longitudinal direction of movement, the direction and distance of the transverse movement being controlled by the control device relative to the weight recorded on the weighing machine, the cutting device being adapted to cut the material parallel to the direction of movement.

The apparatus is especially suitable for cutting meat or fish material of all sizes and shapes, for example cod or salmon. The apparatus is particularly suitable for cutting cod tails having a weight between about 50 g to 175 g, but is also applicable for cutting fillets weighing up to 700 g.

The parallel conveyors conveniently comprise endless belts. The parallel conveyor at least part of which is adapted to form the load-bearing platform of the weighing machine may comprise one or more endless conveyor belts, one of which forms the load-bearing platform. Conveniently, this belt is fixed to the weighing machine via the axles of the rollers.

The control device is advantageously a computer.

A further conveyor is conveniently provided immediately after the cutting device to transport the cut material away.

The adjacent parallel conveyors are preferably separated by a short distance so that there is a gap between them. The presence of this gap helps to eliminate the weight influence caused by any vertical or horizontal change of distance, or any speed difference between the two conveyors. The product has a natural elasticity and the elastic zone of the product in the gap between the two conveyors helps to eliminate this weight influence. Generally, the width of the gap is as small as possible and may conveniently be from about 5 to 100 mm.

The optimum width of the gap depends a great deal on how precisely the mechanical construction of the weighing system has been effected and, clearly, a very precisely manufactured unit will be able to record a more accurate weight with a narrow gap than with a wide gap between the conveyors.

The weighing machine is conveniently of the type consisting of continuously working scales based on load cells, or it may be a spring balance. We have found, surprisingly, that the weighing machine gives a very reliable reading of the weight of that part of the meat or fish material on the load-bearing platform.

The cutting device may be movable when the apparatus includes the means for causing the material to move transversely. When fixed, the cutting device is positioned on a straight line extending beyond the position between the adjacent parallel conveyors. When movable, the cutting device is adapted to move transversely in either direction relative to the longitudinal movement of the fish or meat material on the conveyors. Although any kind of cutting device may be used, for example, jet cutting, a circular saw is preferred.

The means for causing the material to move transversely relative to the longitudinal direction of movement may be a pusher or rod or preferably a conveyor adapted to travel longitudinally and also adapted to move transversely relative to the longitudinal direction of movement. The conveyor adapted to move transversely may conveniently be provided by a single endless conveyor belt capable of travelling longitudinally but also provided with means to move transversely in either direction.

The apparatus advantageously further comprises a fixed guide for the positioning of each piece of material on a conveyor which includes a load-bearing platform.

The movement of the means for causing the material to move transversely relative to the longitudinal direction of movement and of the cutting device may be achieved by a step motor which causes the part to move in either direction transversely before stopping in the appropriate position so that the meat or fish material is cut at the correct point by the cutting device.

DETAILED DESCRIPTION OF EMBODIMENTS OF THE INVENTIONS

In a first embodiment of this invention; the apparatus comprises a pair of adjacent parallel conveyors, a movable cutting device and one weighing machine, wherein at least part of one of the parallel conveyors is adapted to form the load-bearing platform of the weighing machine, the weighing machine being adapted to weigh the material on the load-bearing platform and the direction and distance of the transverse movement of the cutting device being controlled by the weight recorded on the weighing machine.

In the first embodiment of this invention, the width of the gap between the adjacent parallel conveyors may conveniently be from about 20 to 70 mm, more usually from 25 to 60 mm, preferably from 30 to 55 mm and especially from 35 to 51 mm.

The first embodiment of this invention provides a process for the automatic cutting of a piece of material to produce portions of a predetermined weight which comprises placing a piece of the material onto the infeed end of a pair of adjacent parallel conveyors travelling in the same direction substantially at the same speed so that the material lies partly on each conveyor, at least part of one conveyor being adapted to from the load-bearing platform of a weighing machine which records the weight of the material advancing on the load-bearing platform after which the material is cut by a movable cutting device adapted to move transversely relative to the direction of movement of the conveyors, the direction and distance of the transverse movement being controlled by the weight recorded on the weighing machine.

In carrying out the first embodiment of this invention, the piece of material is conveniently placed on the adjacent parallel conveyors manually so that the desired approximate weight of that part of the material which will form the portion having a predetermined weight lies substantially on the conveyor at least part of which is adapted to form the load-bearing platform of the weighing machine, conveniently by ensuring that the material contacts a fixed guide fitted in the appropriate position above this latter conveyor.

In a second embodiment of this invention, the apparatus hereinbefore defined comprises a pair of adjacent parallel conveyors a movable cutting device and two weighing machines, each of the parallel conveyors being adapted to form the load-bearing platform of one weighing machine respectively, each weighing machine being adapted to weigh the material on the respective load-bearing platform so that the weight of the part which will form the portion required is measured by one weighing machine and the weight of the remainder is measured by the other weighing machine, the direction and distance of the transverse movement of the cutting device being controlled relative to the weights recorded on the weighing machines by means of the control device. Advantageously, positioned upstream of the pair of adjacent parallel conveyors, there is an infeed conveyor, for example, an endless belt and, positioned between the pair of adjacent parallel conveyors and the cutting device, there may be an intermediate conveyor which may also be an endless belt.

Generally, the width of the gap between the adjacent parallel conveyors may conveniently be from about 20 to 70 mm, more usually from 25 to 60 mm, preferably from 30 to 55 mm and especially from 35 to 51 mm.

The second embodiment of this invention provides a process for the automatic cutting of a piece of material to produce portions of a predetermined weight which comprises placing a piece of the material onto the infeed end of a pair of adjacent parallel conveyors travelling in the same direction substantially at the same speed so that the material lies partly on each conveyor, each conveyor being adapted to form the load-bearing platform of one weighing machine respectively which record the weight of the part of the material which will form the portion required as well as the weight of the remainder advancing on the load-bearing platforms, which measurements are fed to a control device, after which the material is cut by a moveable cutting device adapted to move transversely relative to the direction of movement of the conveyors, the direction and distance of the transverse movement being controlled by the weight recorded on the weighing machine by means of the control device.

In carrying out the second embodiment of this invention, the piece of material is conveniently placed manually on an infeed conveyor positioned upstream of the adjacent parallel conveyors. Advantageously, the desired approximate weight of that part of the material which will form the portion having a predetermined weight should lie substantially on one of the adjacent parallel conveyors, and this may conveniently be achieved by ensuring that the material contacts a fixed guide fitted in the appropriate position above the infeed conveyor.

After having been weighed, the meat or fish material preferably passes to an intermediate conveyor where it is collected before being cut.

In a third embodiment of this invention, the apparatus hereinbefore defined comprises a pair of adjacent parallel conveyors, a weighing machine positioned along at least one parallel conveyor adapted to form the load-bearing platform of the weighing machine, a cutting device and, positioned between the weighing machine and the cutting device, means for causing the material to move transversely relative to the longitudinal direction of movement.

In this third embodiment, based on the weight recorded and fed to the control device which may be a computer, the means for causing the meat or fish material to move transversely, e.g., a conveyor, is actuated so that the meat or fish material travels an appropriate distance in the direction required so that it is in a more suitable position for cutting the desired weight. Advantageously, one or more further weighing machines may be positioned successively upstream in association with one or more further pairs of adjacent parallel conveyors one or both of each pair being adapted to form the load-bearing platform of any such further weighing machines. In this case, there may be one or more further means, e.g., conveyors, for causing the meat or fish material to move transversely to the longitudinal direction of movement, positioned between any two successive weighing machines. The advantage of more than one weighing machine is that any subsequent weighing machine acts as a check and enables the meat or fish material to be positioned more accurately by the means for causing the material to move transversely to the longitudinal direction of movement, positioned downstream of a preceding weighing machine.

It should be understood that when both of a pair of adjacent parallel conveyors are adapted to form the load-bearing platforms of further weighing machines, each parallel conveyor is adapted to form the load-bearing platform of one weighing machine respectively, each of which weighs the material on the respective load-bearing platform, so that the weight of the part of the material which will form the portion required is measured by one weighing machine and the weight of the remainder is measured by the other weighing machine. When one or more further weighing machines are present, advantageously, one or more further cutting devices are present, which may be positioned downstream of a conveyor adapted to travel longitudinally and which are also adapted to travel transversely to the longitudinal direction of movement. Generally, the width of the gap between the adjacent parallel conveyors may conveniently be from about 20 to 70 mm, more usually from 25 to 60 mm, preferably from 30 to 55 mm and especially from 35 to 51 mm.

The third embodiment of this invention provides a process for the automatic cutting of a piece of material to produce portions of a predetermined weight which comprises placing a piece of the material onto the infeed end of a pair of adjacent parallel conveyors travelling in the same direction substantially at the same speed so that the material lies partly on each conveyor, at least part of one conveyor being adapted to form the load-bearing platform of a weighing machine which records the weight of the material advancing on the load-bearing platform, the recorded weight measurement is fed to a control device which actuates a means positioned downstream of the weighing machine to cause the material to move transversely relative to the longitudinal direction of movement of the parallel conveyors, the direction and distance of the transverse movement being determined by the weight recorded, after which the material is cut by a cutting device in a direction parallel to the longitudinal direction of movement of the parallel conveyors.

The meat or fish material is conveniently placed on the adjacent parallel conveyors manually so that the desired approximate weight of that part of the material which will form the portion having a predetermined weight lies substantially on the conveyor adapted to form the load-bearing platform of the weighing machine, conveniently by ensuring that the material contacts a fixed guide fitted in the appropriate position above this latter conveyor.

In a fourth embodiment of this invention, the apparatus hereinbefore defined comprises a pair of adjacent parallel conveyors, and a plurality of weighing machines positioned successively wherein at least part of one of the parallel conveyors is adapted to form the load-bearing platforms of the weighing machines, each succeeding weighing machine being offset laterally to a degree corresponding to the desired length of the portions of the material which lie on the load-bearing platform and being preprogrammed for a certain weight according to the said desired length, and adapted to weigh the material lying on the load-bearing platform, the cutting device being positioned downstream of the downstream weighing machine, the direction and distance of the transverse movement of the cutting device or the means for causing the material to move transversely being controlled by the actual weight recorded compared with the preprogrammed weight with respect to a particular weighing machine.

The parallel conveyor which is adapted to form the load-bearing platforms of the weighing machines conveniently comprises a plurality of successive conveyors each of which is conveniently fixed to a respective weighing machine via the axles of the rollers. Since the weighing machines are offset laterally, the parallel conveyors adapted to form the load-bearing platforms of the weighing machines are also conveniently offset laterally.

In the fourth embodiment of this invention, generally the width of the gap between the adjacent parallel conveyors may vary from about 10 to 100 mm. In order to reduce the width of these gaps, a rope conveyor is conveniently placed between the offset parallel conveyors and the adjacent parallel conveyor not adapted to form the load-bearing platforms of weighing machines. The gap may be narrowest or widest at either the upstream or the downstream end or intermediate depending on how the weighing machines are offset.

In the fourth embodiment of this invention, because the weighing machines are offset, a different length of the piece of material comes to lie on each weighing machine and each particular weighing machine is preprogrammed for a certain weight according to the length of the material. It should be understood that the preprogrammed weight is a range, for example, spanning about 5% on either side of the desired weight. The control device is also conveniently preprogrammed for a certain range of lengths, e.g., also about 5% above or below the desired length, and also for the combination of weight and length parameters. The weight recorded by a particular weighing machine is fed to the control device which may be a computer and, based on how the actual weight compares with the preprogrammed weight of a particular weighing machine, on the preprogrammed length, and on the preprogrammed combination of weight and length parameters, the cutting device or the means for causing the piece of material to move transversely is actuated so that either the cutting device or the piece of material travels an appropriate distance in the direction required so that the size closest to the desired weight and length may be cut by the cutting device.

There are two major advantages for having a plurality of weighing machines which are offset. One is that the subsequent weighing machines are offset to different degrees giving the possibility to obtain portions of different weight and length at the same time. The second major advantage is that the cut pieces of material may automatically be graded in length and weight groups because the length varies depending on which preprogrammed weighing machine the material is weighed, and a signal can be fed to a control device which actuates means for separating the cut pieces in size groups. The number of offset weighing machines may conveniently be from 2 to 8, preferably from 3 to 6.

The fourth embodiment of this invention also provides a process for the automatic cutting of a piece of material by a fixed or movable cutting device to produce portions of a predetermined weight nd length which comprises placing a piece of the material onto the infeed end of a pair of adjacent parallel conveyors travelling in the same direction substantially at the same speed so that the material lies partly on each conveyor, at least part of one conveyor being adapted to form the load-bearing platforms of a plurality of weighing machines positioned successively, each succeeding weighing machine being offset laterally to a degree corresponding to the desired length of the portions of the material which lie on the load-bearing platform and being preprogrammed for a certain weight according to the said desired length, the cutting device being positioned downstream of the downstream weighing machine, the weighing machines record the weight of the material advancing on the load-bearing platform, the recorded weight measurement is fed to a control device which actuates either the cutting device, when movable, to move transversely to the direction of movement of the conveyor or, when the cutting device is fixed, a means positioned downstream of the weighing machine to cause the material to move transversely relative to the longitudinal direction of movement of the parallel conveyors, the direction and distance of the transverse movement of the cutting device or the means for causing the material to move transversely being controlled by the weight recorded compared with the preprogrammed weight with respect to a particular weighing machine, after which the material is cut by the cutting device in a direction parallel to the longitudinal direction of movement of the parallel conveyors.

Afterwards the cut pieces may be graded in length and weight groups by a means actuated by a control device which receives a signal from the weighing machine which records the weight and separates the cut pieces in size groups.

The piece of material is conveniently placed on an infeed conveyor upstream of the adjacent parallel conveyors manually so that the desired approximate weight of that part of the material which will form the portion having a predetermined weight lies substantially on the conveyor adapted to form the load-bearing platforms of the respective weighing machines, conveniently by ensuring that the material contacts an adjustable guide bar.

The fourth embodiment of this invention is particularly suitable for cutting cod tails having a weight between about 60 g to 175 g, but is also applicable for cutting fillets weighing up to 700 g.

In a fifth embodiment of this invention, the apparatus hereinbefore defined comprises at least two adjacent parallel conveyors, at least two adjacent parallel weighing machines and a computer wherein the computer is preprogrammed for at least one product factor defining a specified weight for a specified length and at least part of each of the parallel conveyors is adapted to form the load-bearing platform of one of the weighing machines, each weighing machine being adapted to weigh the material lying on the load-bearing platform and to feed the recorded weight to the computer which is adapted to calculate a weight factor defining a specified weight for a specified length of material, the direction and distance of the transverse movement of the cutting device or the means for causing the material to move transversely being controlled by a comparison of the actual weight factors calculated with the preprogrammed product factors.

The weight factors depend on the width, thickness and density of the meat or fish material lying on a particular weighing machine.

Generally, the width of the gap between the adjacent parallel conveyors is as small as possible and may conveniently be from about 5 to 20 mm and preferably from 7.5 to 15 mm.

Since the widths of the load-bearing platforms and the width of the gaps are known, the weight recorded by each weighing machine can be used to calculate the weight factors by the computer which compares the weight factors with the preprogrammed product factor and actuates the cutting device or the means for causing the piece of material to move transversely so that either the cutting device or the piece of material travels an appropriate distance in the direction required so that the desired weight and length may be cut by the cutting device. It should be understood that the preprogrammed product factor is a range of weights and lengths conveniently spanning up to 10% on either side of the desired weight and length. Preferably, the computer is preprogrammed for more than one product factor, thus enabling portions of different weight and length specifications to be obtained at the same time.

The major advantage in having at least two parallel weighing machines is that immediate information can be obtained about the weight distribution along the meat or fish pieces and by means of a computer it will be possible to select the optimal cutting pattern for each piece of product at a very high speed. The number of parallel weighing machines may conveniently be from 3 to 10, preferably from 4 to 6. If desired, a second set of adjacent parallel conveyors adapted to form the load-bearing platforms of weighing machines may be present upstream of the cutting device and downstream of, and transversely displaced in relation to, the adjacent parallel conveyors hereinbefore described. The transverse displacement is preferably less than the width of one conveyor and conveniently 25% to 75% of the width. This makes it possible to record the weight for less length of material.

The fifth embodiment of this invention provides a process for the automatic cutting of a piece of material by a fixed or movable cutting device to produce portions of a predetermined weight and length which comprises placing a piece of the material onto the infeed end of at least two adjacent parallel conveyors travelling in the same direction substantially at the same speed so that the material lies partly on at least two conveyors, at least part of each conveyor being adapted to form the load-bearing platform of a weighing machine, the cutting device being positioned downstream of the weighing machines, the weighing machines record the weight of the material advancing on the load-bearing platforms, the recorded weight measurement is fed to a computer which is preprogrammed for at least one product factor defining a specified weight for a specified length and which calculates, from the recorded weight measurement, a weight factor defining a specified weight for a specified length of material, compares the actual weight factor calculated with the preprogrammed product factor and then actuates either the cutting device, when movable, to move transversely to the direction of movement of the conveyor or, when the cutting device is fixed, a means positioned between the weighing machines and the cutting device to cause the material to move transversely relative to the longitudinal direction of movement of the parallel conveyors, the direction and distance of the transverse movement of the cutting device or the means for causing the material to move transversely being controlled by the comparison of the actual weight factor calculated with the preprogrammed product factor, after which the material is cut by the cutting device in a direction parallel to the longitudinal direction of movement of the parallel conveyors.

The computer is preferably preprogrammed for more than one product factor and afterwards, the cut pieces may be graded by length by a means actuated by the computer.

The meat or fish material is conveniently placed on the apparatus manually so that the desired approximate weight of that part of the material which will form the portion having a predetermined weight lies substantially on the parallel conveyors adapted to form the load-bearing platforms of the weighing machines, conveniently by ensuring that the material contacts a fixed guide fitted in the appropriate position above the conveyors.

The fifth embodiment of this invention is particularly suitable for cutting cod tails having a weight between about 50 g to 175 g, but is also applicable for cutting fillets weighing up to 700 g.

The present invention is illustrated by way of example with reference to the accompanying drawings:

BRIEF DESCRIPTION OF THE DRAWINGS

FIG. 5 represents a diagrammatic side plan view of an apparatus having fixed cutters and FIG. 6 represents a diagrammatic top plan view of the apparatus of FIG. 5, while

DETAILED DESCRIPTION OF THE DRAWINGS

Figures 1, 2:
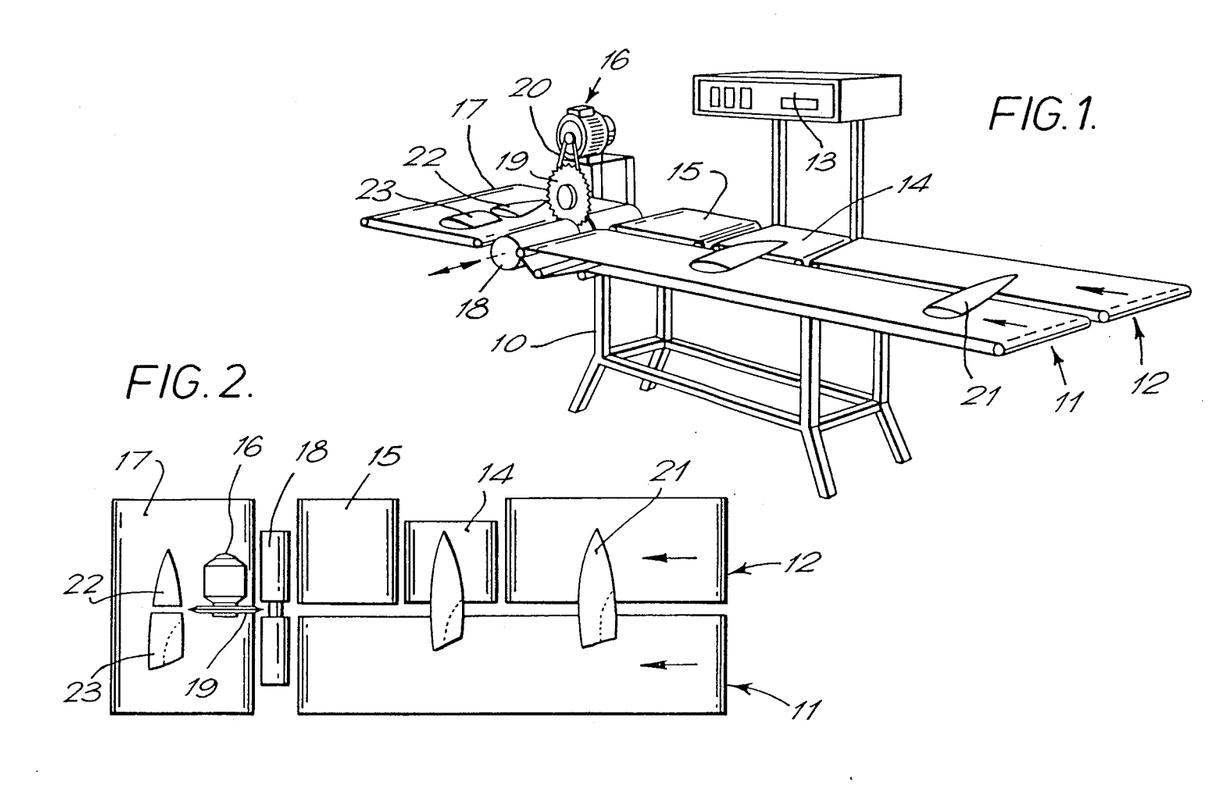
FIG. 1 represents a perspective view of the apparatus and FIG. 2 represent a top plan view of the apparatus of the first embodiment of this invention.

Referring to FIGS. 1 and 2 of the drawings, the apparatus comprises a supporting frame 10, parallel endless belts 11 and 12 separated by a gap of 40 mm width, a check weighing machine 13 computed with a computer, an endless belt 14 which forms the load-bearing platform of the weighing machine, an intermediate belt 15, a movable cutting unit 16 and a further endless belt 17. The movable cutting unit 16 comprises a roller 18 capable of moving back and forth in the direction of the arrow, together with a circular saw 19 driven with a band 20. The back and forth movement of the cutting unit is controlled by a step motor (not shown).

In operation, fillets of cod 21 are placed manually onto the parallel belts 11 and 12 at the infeed end so that approximately 120 g of the tail end lies on belt 12. This is achieved by placing the fillet so that the end of the tail of each fillet touches a fixed guiding bar (not shown) fitted above the belt 12. The cod fillets 21 advance in the direction of the arrows and on reaching the belt 14, the weight of the tail end is recorded. A signal actuates the step motor provided with a control device (not shown) which causes the movable cutting unit 16 to travel the appropriate distance transversely to the direction of movement of the parallel belts 11 and 12 so that the cutter is in the correct position for cutting the cod fillets which, in the meantime, have passed from belt 14 on to the intermediate belt 15 where they are collected while the cutting unit is travelling to the appropriate position. On traversing the roller 18 the cod fillets are cut to give tail portions 22 each weighing 120 g which are separated from the remaining cod fillet 23 whereupon the separated portions advance to the endless belt 17 where they are transported away for further processing.

Figures 3, 4:
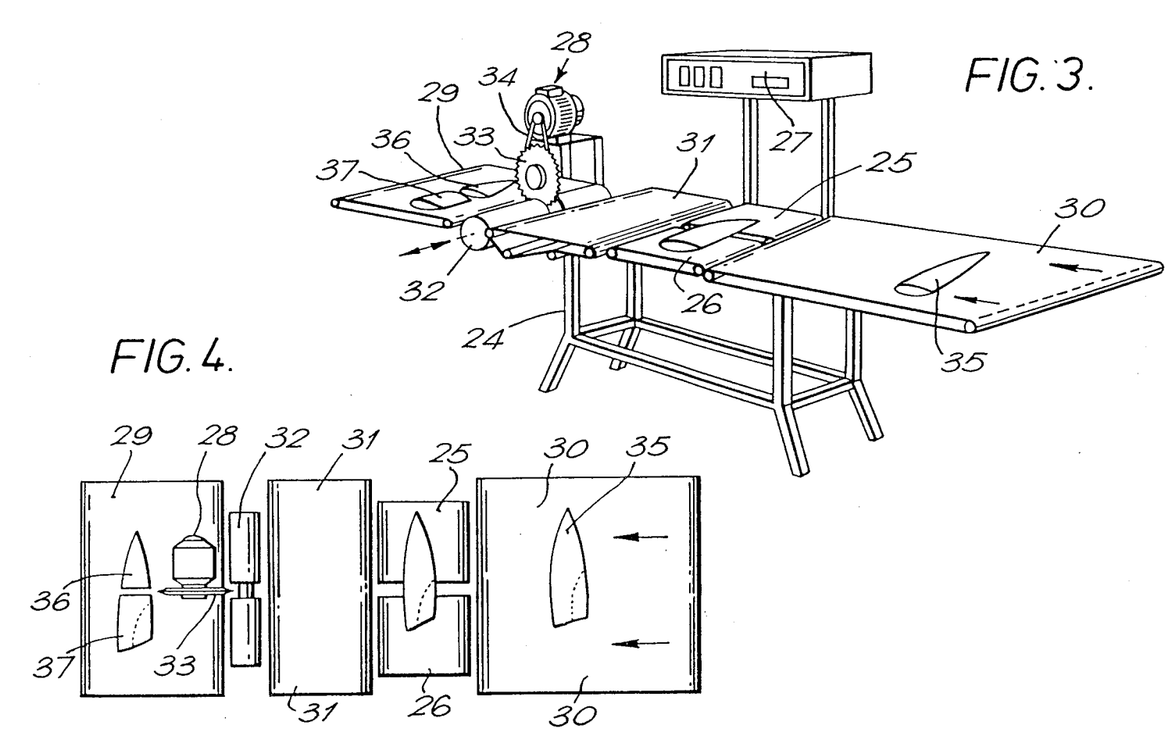
FIG. 3 represents a perspective view of the apparatus and FIG. 4 represents a top plan view of the apparatus of the second embodiment of this invention.

Referring to FIGS. 3 and 4 of the drawings, the apparatus comprises a supporting frame 24, parallel endless belts 25 and 26 separated by a gap of 40 mm width, each of which forms the load-bearing platform of a check weighing machine (not shown) computed with a computer, a weight recording unit 27, a movable cutting unit 28 and an endless belt 29. Upstream of endless belts 25, 26 is an infeed belt 30, and downstream of endless belts 25, 26 is an intermediate belt 31. The movable cutting unit comprises a roller 32 capable of moving back and forth in the direction of the arrow together with a circular saw 33 driven with a belt 34. The back and forth movement of the cutting unit is controlled by a step motor (not shown).

In operation, fillets of cod 35 are placed manually onto the infeed belt 30 in such a position that when a fillet reaches the parallel belts 25 and 26 at the infeed end approximately 120 g of the tail end lies on the belt 25. This is achieved by placing the fillet so that the end of the tail of each fillet touches a fixed guiding bar (not shown) fitted above the belt 30. The cod fillets 35 advance in the direction of the arrows and on reaching the belts 25 and 26 the weight of the whole fillet and the weight of the tail end is recorded. This information is fed to the computer which is programmed by means of a factor to actuate the step motor which causes the movable cutting unit 28 to travel the appropriate distance transversely to the direction of movement of the parallel belts 25 and 26 so that the cutter is in the correct position for cutting the cod fillets which, in the meantime, have passed from belts 25, 26 to the intermediate belt 31 where they are collected while the cutting unit is travelling to the appropriate position. On traversing the roller 32 the cod fillets are cut to give tail portions 36 each weighing 120 g which are separated from the remaining cod fillet 37 whereupon the separated portions advance to the endless belt 29 where they are transported away for further processing.

Figure 5:
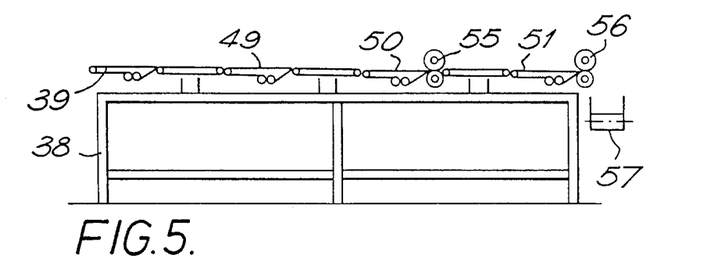
Figure 6:
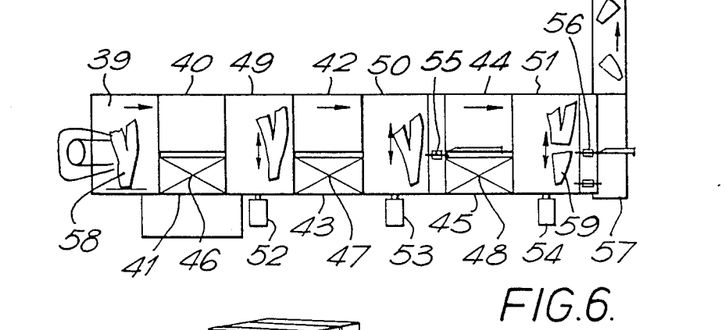
Figure 7:
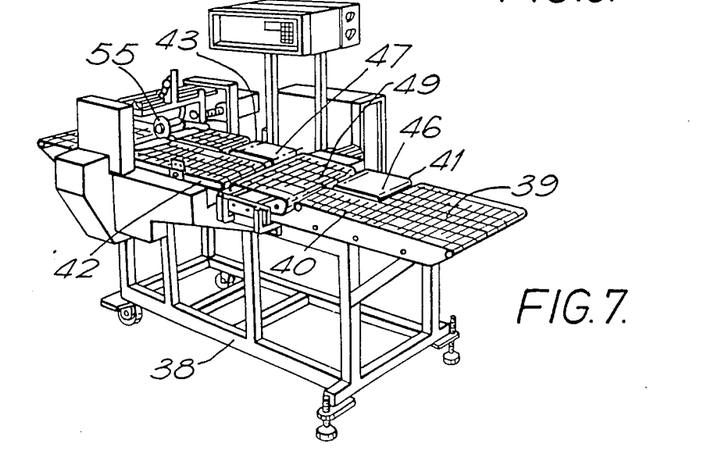
FIG. 7 represents a perspective view of an apparatus having a movable cutter of the third embodiment of this invention.

Referring to FIGS. 5, 6 and 7 of the drawings, the apparatus comprises a supporting frame 38, an infeed conveyor 39, pairs of adjacent parallel conveyors 40 and 41, 42 and 43, 44 and 45 of which conveyors 41, 43 and 45 are adapted to form the load-bearing platforms of weighing machines 46, 47 and 48 respectively. Upstream of each pair of adjacent parallel conveyors is a conveyor adapted to move transversely to the longitudinal direction 49, 50 and 51, by means of step-motors 52, 53 and 54 respectively. A circular saw 55 is positioned downstream of conveyor 50 and another circular saw 56 is positioned downstream of conveyor 51 while an outfeed belt 57 is positioned downstream of circular saw 56. In the operation of the apparatus illustrated in FIGS. 5 and 6, fillets of cod 58 are placed manually onto the infeed conveyor 39 so that approximately 120 g of the tail end lies on the infeed conveyor. This is achieved by placing the fillet so that the end of the tail contacts a fixed guiding bar (not shown) fitted above the infeed conveyor. The cod fillets 58 advance in the direction of the arrows and on reaching conveyors 40, 41 the weight of the tail is recorded by weighing machine 46. This weight measurement is fed to a control device (not shown) which actuates the step-motor 52 to cause the conveyor 49 to move transversely as the cod fillet advances on it downstream. If the weight recorded is higher than the desired 120 g, the conveyor 49 moves transversely (to the left of the longitudinal movement of the fillets in FIG. 6), whereas if the weight recorded is lower than 120 g, the conveyor 49 moves in the opposite direction. This enables the weight of the cod tail to approach the desired 120 g.

As the cod fillet advances to conveyors 42, 43, the weight of the tail is recorded by weighing machine 47. By the same procedure as described above, as the cod fillet advances downstream on conveyor 50, this conveyor moves an appropriate distance transversely (to the left or the right as shown in FIG. 6) to ensure that the weight of the cod tail is even nearer to 120 g. As the cod fillet advances, it is cut by the fixed circular saw 55 to separate a cod tail 59 having a weight of very near to 120 g from the rest of the fillet. The cod tail and the rest of the fillet then advance on to conveyors 44, 45 where the weight of the cod tail is checked by weighing machine 48 and by the same procedure as described previously, and as the cod tail advances on conveyor 51, this conveyor moves an appropriate distance in the appropriate direction transversely to ensure that when the cod tail reaches the fixed circular saw 56, the cod tail is cut, if necessary, so that it has a weight of almost exactly 120 g. The cod tail is then transported away on the outfeed belt 57 for further processing.

In order to avoid underweight cod tails, the weight setting of the weighing machines 46 and 47 may be slightly higher than the desired nominal weight of the cod tails which means that the transversal positioning of the cod fillet will always be at the upper side of the nominal weight resulting in the fact that the weight of the cod tail cut by the circular saw 55 will be slightly overweight prior to the final weight adjustment of the cod tail by the circular saw 56.

The operation of the apparatus illustrated in FIG. 7 proceeds in exactly the same way as that of the apparatus illustrated in FIGS. 5 and 6 until the weight of the tail is recorded by weighing machine 47. This weight measurement is fed to a control device (not shown) which actuates the step motor of the movable circular saw 55 to cause the circular saw to move transversely the appropriate distance so that as the cod tail advances, it is cut in the correct position to give the desired weight of almost exactly 120 g. The cod tail is then transported away on an outfeed belt for further processing.

Figure 8:
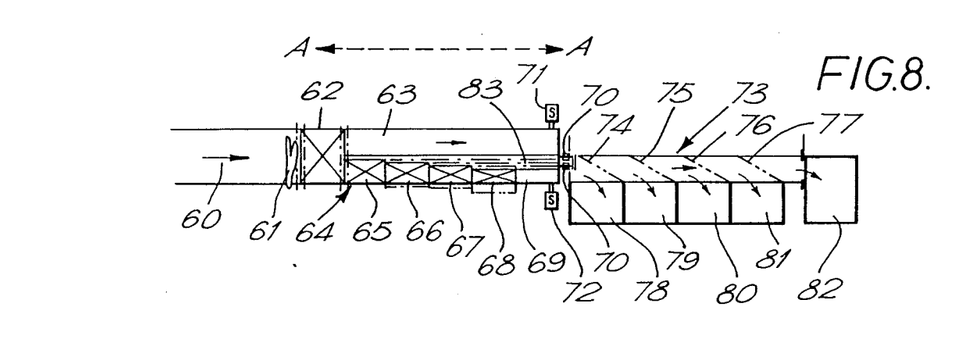
FIG. 8 represents a diagrammatic top plan view of an apparatus having four offset weighing machines and FIG. 9 is an enlarged version of the part designated A—A in FIG. 8 of the fourth embodiment of this invention.
Figure 9:
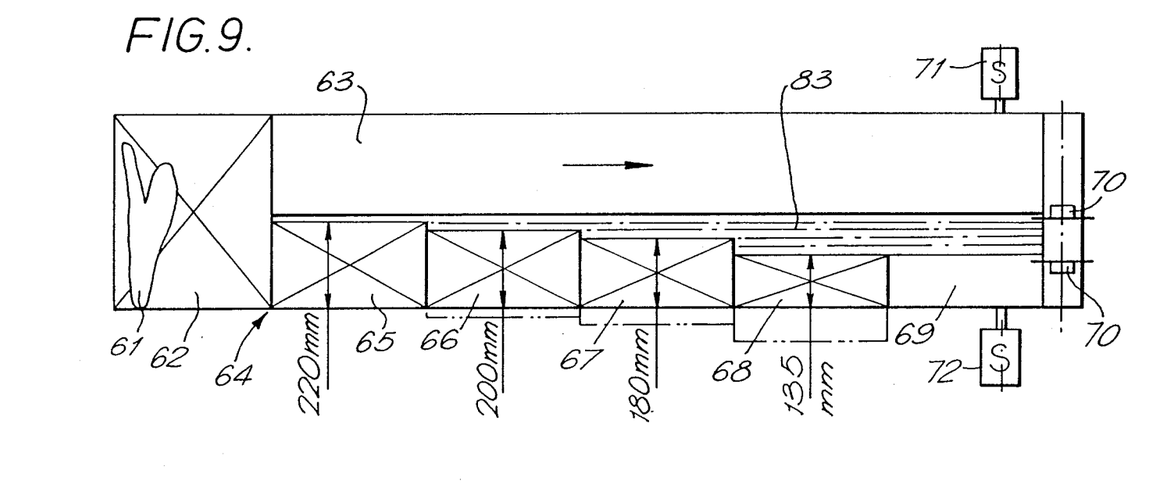

Referring to FIGS. 8 and 9 of the drawings, the apparatus comprises an infeed conveyor 60 on which rests a fillet of cod 61, a check weighing machine 62, parallel conveyors 63 and 64, parallel conveyor 64 consisting of 5 separate conveyor belts 65,66,67,68 and 69, of which belts 65,66,67 and 68 form the load-bearing platforms of weighing machines offset laterally from one another. Downstream of the weighing machines are two movable cutting knives 70 activated by step motors 71 and 72. Downstream of the cutting knives is a further conveyor belt 73 provided with gates 74,75,76,77 actuated by a control device (not shown) and below each of which is a container 78,79,80 and 81, respectively, and at the downstream end of the belt 73 is a further container 82. The gap between conveyor belt 63 and conveyor belts 66,67,68 and 69 is filled out with roped conveyor 83.

In operation, fillets of cod 61 are placed manually on to the infeed conveyor belt 60 and positioned so that the tail ends contact an adjustable guide bar (not shown) located above the edge of the infeed conveyor belt 60 at its right hand side relative to the direction of motion indicated by the arrow. The fillets of cod pass in the direction of the arrow over the check weighing machine 62 which records the entire weight of the fillet and which can prevent the cutting of a large tail from a small fillet by passing a signal to the control device which can block the access to some of the offset weighing machines, if necessary. The cod fillets 61 then advance along the load-bearing platforms of conveyor belts 65,66,67 and 68.

As can be seen from the drawings, in view of the positioning of the cod fillets on the infeed belt and because the belts 65,66,67 and 68 are offset laterally, while the whole width of belt 65 is covered by portions of cod fillets, successively less of the width of belts 66,67 and 68 are covered and therefore the length of cod fillets on each succeeding belt is progressively less.

In FIG. 9, the width of each of the belts 65,66,67 and 68 is 220 mm, the length of the portion of cod fillet on belt 65 is 220 mm, the length on belt 66 is 200 mm, the length on belt 67 is 180 mm and the length on belt 68 is 135 mm. The preprogrammed weights desired are 150 g, 125 g, 105 g and 80 g on belts 65,66,67 and 68, respectively. When the recorded weight of the tail lying on one of the weighing machines corresponds to the preprogrammed weight according to its length, this weight measurement is fed to a control device (not shown) which actuates the step motor 71 or 72 to cause one of cutting knives 70 to move transversely to the longitudinal direction of movement of the fillet until it is in the appropriate position of cutting the advancing cod fillet. In addition, a signal from the weighing machine which records the desired weight is sent to a control device which actuates the appropriate gate (74,75,76 or 77) to close so causing the cut cod tail to fall into the appropriate container (78,79,80 or 81). In this way the cut cod tails are graded according to their weights and lengths. If the tail of the fillet does not fall within the preprogrammed values for weight according to length, the tail will not be cut off from the fillet and will be collected in container 82.

Figure 10:
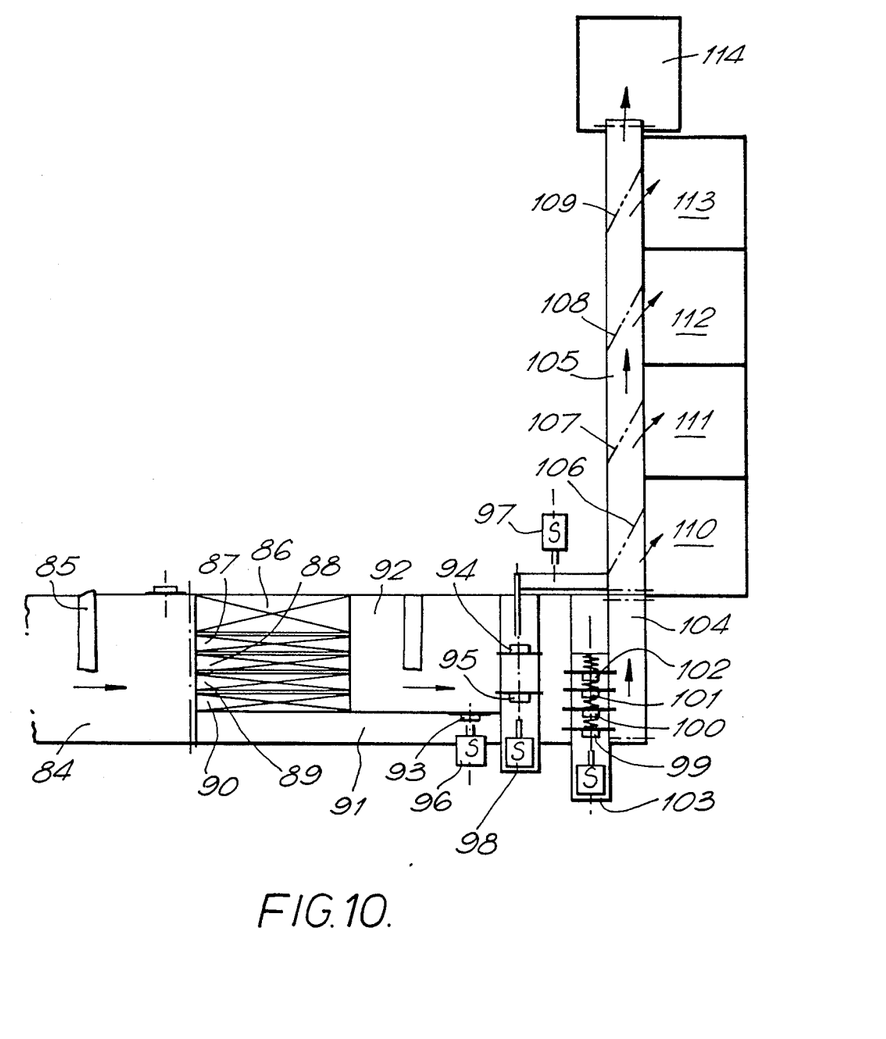
FIG. 10 represents a diagrammatic top plan view of an apparatus having five parallel weighing machines and FIG. 11 represents a perspective view of the same apparatus of the fifth embodiment of this invention.
Figure 11:
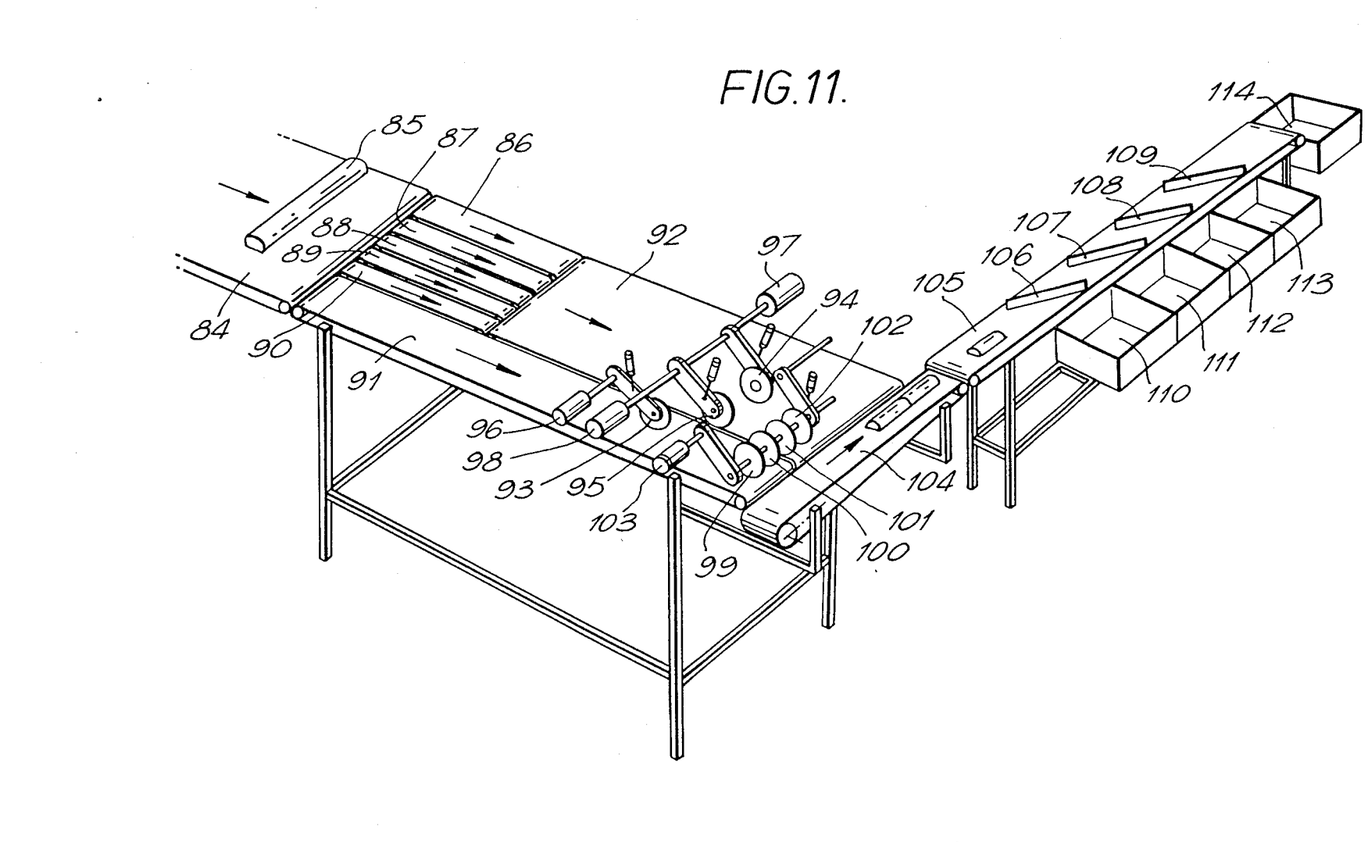

Referring to FIGS. 10 and 11 of the drawings, the apparatus comprises an infeed conveyor 84 on which rests the back piece of a pretrimmed fillet of cod 85, parallel endless belts 86,87,88,89,90 and 91 of which each of belts 86,87,88,89,90 forms the load-bearing platform of a weighing machine, respectively. Belt 86 is 100 mm wide and belts 87,88,89 and 90 are 50 mm wide. There is a gap of 10 mm between each belt. Downstream of the weighing machines is a conveyor 92 and downstream of conveyor 92 are cutting knives 93,94 and 95 positioned by step-motors 96,97 and 98 respectively. Downstream of cutting knives 94 and 95 are chunk knives 99,100,101 and 102 activated by step-motor 103. Downstream of the chunk knives is a conveyor 104 and an accelerating conveyor belt 105 provided with pushers 106,107,108 and 109 activated by a computer (not shown) and below each of which is a container 110,111,112 and 113, respectively, and at the downstream end of the belt 105 is a further container 114.

In operation, the back pieces of the pretrimmed fillets of cod 85 are placed manually on infeed conveyor belt 84 and positioned so that one end contacts an adjustable guide bar (not shown) located above the edge of the infeed conveyor belt 84 at its left hand side relative to its direction of motion indicated by the arrow. The back pieces pass in the direction of the arrow towards the adjacent parallel belts. The back pieces advance over the load-bearing platforms of the endless belts and the weights of that part of the back piece on each belt are recorded and these weights, together with the lengths of the back piece lying on each belt, are fed to a computer (not shown) which calculates the weight factor for each belt, i.e., the weight/length. The computer is preprogrammed for four product factors and by comparing the actual obtained weight factors along the back piece with the preprogrammed product factors, if any combination of weight factors matches one of the preprogrammed product factors, the computer calculates the position where the cutting is required and actuates at least one of the step motors 96,97 or 98 to cause the appropriate cutting knife 93,94 or 95 to move transversely to the longitudinal direction of movement of the back piece until the knife is in the appropriate position for cutting the back piece advancing on conveyor belt 92. Once the back piece has been cut, the desired cut product advances along the conveyor 104 and the accelerating conveyor 105 where a further signal from the computer actuates the appropriate pusher 106,107,108 or 109 to close so causing the cut fillet to fall into the appropriate container 110,111,112, 113 or 114.

EXAMPLE

As a specific example, the computer was preprogrammed of four different product factors as follows:

| Product weight | | Product length | Product factor | |
|---|---|---|---|---|
| 150 g | 10 g | 140-150 mm | 1.06897 | 0.06897 |
| 120 g | 10 g | 125-135 mm | 0.96154 | 0.07692 |
| 88 g | 2 g | 100-130 mm | 0.77391 | 0.01739 |
| 80 g | 10 g | 90-110 mm | 0.85 | 0.1 |

For example, if the length of the back piece of the cod fillet is 30 mm, it is possible to produce two 150 gram loins if the product factor is high enough. If the product factor is low, it is possible to cut three smaller pieces, e.g., each weighing 80 g. In addition, it is possible to cut combinations of larger or smaller loins in accordance with the obtained weight factors along the fillet of cod.

If the obtained weight factors do not match any of the preprogrammed product factors, the cutting knives 93,94 and 95 are not actuated and, in this case, the chunk knives 99,100,101 and 102 are actuated by the computer via the step motor 103 to cut the back piece into chunks which are collected either in a container or on a conveyor belt for transport to the freezer.

What is claimed is:

1. An apparatus for cutting pieces of a material for obtaining a cut portion from each piece having a predetermined weight comprising:

two adjacent parallel conveyors adapted for travelling in the same direction at substantially the same speed for transporting pieces of a material to be cut, each conveyor being positioned relative to other for transporting a portion of each piece of material to be cut, and wherein at least a part of at least one of the conveyors forms at least one load-bearing platform;

a weighing machine associated with each load-bearing platform for, in combination with each load-bearing platform, weighing the portion of each piece transported on each load-bearing platform for determining a weight for that portion;

a cutting unit which is adapted for moving transversely relative to the direction of transport of the pieces on the conveyors and for receiving the transported pieces from the conveyors for cutting each piece parallel to its direction of travel; and a control device for analyzing each determined weight for each weighed portion for controlling the transverse movement of the cutting unit for positioning the cutting unit, with respect to each weight determined, for cutting each weighed piece at a position for obtaining a cut portion having a predetermined weight.

2. An apparatus for cutting pieces of a material for obtaining a cut portion from each piece having a predetermined weight comprising:

two adjacent parallel conveyors adapted for travelling in the same direction at substantially the same speed for transporting pieces of material to be cut, each conveyor being positioned relative to the other for transporting a portion of each piece of material to be cut, and wherein at least a part of at least one of the conveyors forms at least one load-bearing platform;

a weighing machine associated with each load-bearing platform for, in combination with each load-bearing platform, weighing the portion of each piece transported on each load-bearing platform for determining a weight for that portion;

a cutting unit which is adapted for receiving the transported pieces from the conveyors and for cutting each piece parallel to its direction of travel;

means for causing the weighed pieces to move transversely relative to the direction of transport of the pieces on the conveyors for positioning the weighed pieces for cutting; and a control device for analyzing each determined weight for each weighted portion for controlling movement and positioning with respect to each weight determined, of the means for causing transverse movement of the pieces to be cut for positioning each weighted piece for cutting at a position for obtaining a cut portion having a predetermined weight.

3. An apparatus according to claim 1 or 2 wherein the conveyors are separated by a gap distance of from about 5 mm to about 100 mm.

4. An apparatus according to claim 1 or 2 wherein the conveyors are separated by a gap distance of from about 20 mm to 70 mm.

5. An apparatus according to claim 1 or 2 wherein the cutting unit includes a cutting device and a roller for receiving the transported pieces from the conveyors.

6. An apparatus according to claim 1 or 2 further comprising a fixed guide positioned with respect to one of the conveyors for positioning of each piece on the conveyors.

7. An apparatus according to claim 1 wherein at least a part of each conveyor forms a load-carrying platform, each platform being associated with a weighing machine, for determining a weight of each portion of each piece on each conveyor for, by means of the control device, controlling movement and position, with respect to the weights determined, of the cutting unit for cutting each weighed piece for obtaining the cut portion having the predetermined weight.

8. An apparatus according to claim 7 wherein the control device is a computer preprogrammed for at least one product factor defining a specified weight for a specified length of the pieces to be cut and adapted for receiving weights determined by each weighing machine for calculating weight factors defining a specified weight for a specified length of each piece to be cut for controlling and positioning of the cutting unit for cutting the pieces by means of calculating the weight factors with respect to the preprogrammed product factors for obtaining the cut portion having the predetermined weight.

9. An apparatus according to claim 8 wherein the conveyors are separated by a gap distance of from 5 mm to 20 mm.

10. An apparatus according to claim 1 wherein the control device is a computer preprogrammed for at least one product factor defining a specified weight for a specified length of the pieces to be cut and adapted for receiving weights determined by each weighing machine for calculating weight factors defining a specified weight for a specified length of each piece to be cut, and wherein one of the separate adjacent parallel conveyors includes a plurality of load-bearing platforms each of which are associated with a weighing machine and which are positioned successively and offset laterally to a degree corresponding to a preprogrammed specified length for controlling and positioning of the cutting unit for cutting the pieces by means of calculating the weight factors with respect to the preprogrammed product factors for obtaining the cut portion having the predetermined weight.

11. An apparatus according to claim 10 wherein a rope conveyor is positioned in the gap between the conveyors.

12. An apparatus according to claim 10 or 11 wherein there are from 2 to 8 load-bearing platforms and associated weighing machines.

13. An apparatus according to claim 10 or 11 wherein the conveyors are offset by a gap distance of from 10 mm to 100 mm.

14. An apparatus according to claim 10 or 11 further comprising means for separating the cut pieces into size groups.

15. An apparatus according to claim 1 wherein the means for causing transverse movement of the pieces is an endless conveyor belt for receiving the pieces from and for transporting the pieces in the same direction as the adjacent parallel conveyors transport the pieces and adapted for being moved transversely relative to the direction of transport of the pieces for positioning each weighed piece for cutting for obtaining the cut portion having the predetermined weight.

16. An apparatus according to claim 2 wherein at least a part of at least one of the adjacent parallel conveyors has at least one additional load-bearing platform, each of which being associated with a weighing machine, positioned between the means for causing transverse movement of the weighed pieces to be cut and the cutting unit and further comprising at least one additional means, downstream of each additional load-bearing platform and weighing machine, for causing transverse movement of the additionally weighed pieces for, by means of the control unit, further controlling positioning of each piece, with respect to each weight determined, for cutting for obtaining the cut portion having the predetermined weight.

17. An apparatus according to claim 15 wherein further comprising two additional separate adjacent parallel conveyors positioned between the means for causing transverse movement of the weighed pieces to be cut and the cutting unit for receiving the pieces from the means for causing transverse movement of the pieces wherein at least a part of at least one of the additional adjacent parallel conveyors forms a load-bearing platform, each of which being associated with a weighing machine, and further comprising at least one additional means downstream of each additional pair of conveyors for moving the additionally weighed pieces transversely relative to the direction of the transport of the pieces for, by means of the control unit, further controlling positioning of the piece, with respect to each additional weight determined, for cutting for obtaining the cut portions having the predetermined weight.

18. An apparatus according to claim 17 further comprising an additional cutting unit positioned between the first means for causing transverse movement of the pieces and the next additional adjacent conveyors for cutting each piece prior to transport on the additional conveyors for additional weighing of at least the portion cut for further positioning of the cut portion for further cutting for obtaining the cut portion having the predetermined weight.

19. An apparatus according to claim 12 wherein at least a part of each conveyor forms a load-bearing platform, each platform being associated with a weighing machine, for determining a weight of each portion of each piece on each conveyor and wherein the control device is a computer preprogrammed for at least one product factor defining a specified weight for a specified length of the pieces to be cut and adapted for receiving weights determined by each weighing machine for calculating weight factors defining a specified weight for a specified length of each piece to be cut for controlling and positioning of the pieces to be cut by the means for causing transverse movement of the pieces by means of calculating of the weight factors with respect to the preprogrammed product factors for obtaining the cut portion having the predetermined weight.

20. An apparatus according to claim 19 wherein the conveyors are separated by a gap distance of from 5 mm to 20 mm.

21. An apparatus according to claim 12 wherein the control device is a computer preprogrammed for at least one product factor defining a specified weight for a specified length of the pieces to be cut and adapted for receiving weights determined by each weighing machine for calculating weight factors defining a specified weight for a specified length of each piece to be cut, wherein one of the separate adjacent parallel conveyors includes a plurality of load-bearing platforms, each platform being associated with a weighing machine and being positioned successively and offset laterally to a degree corresponding to a preprogrammed specified length, for controlling and positioning of the means for causing transverse movement of the pieces for positioning for cutting by means of calculating the weight factors with respect to the preprogrammed product factors for obtaining the cut portion having the predetermined weight.

22. An apparatus according to claim 21 wherein a rope conveyor is positioned in the gap between the conveyors.

23. An apparatus according to claim 21 or 22 wherein there are from 2 to 8 load bearing platforms and associated weighing machines.

24. An apparatus according to claim 21 or 22 wherein the conveyors are offset by a gap distance of from 10 mm to 100 mm.

25. An apparatus according to claim 21 or 22 further comprising means for separating the cut pieces into size groups.

26. An apparatus according to claim 2 wherein the cutting device is movable transversely relative to the direction of transport of the pieces, the transverse movement of the cutting unit is also being controlled by the control device for also controlling positioning of the cutting unit, with respect to each weight determined, at a position for cutting for obtaining the cut portion having the predetermined weight.

27. A process for cutting pieces of material for obtaining a cut portion from each piece having a predetermined weight comprising:
placing and transporting pieces of material to be cut on a pair of separate adjacent parallel conveyors travelling in the same direction at substantially the same speed wherein a portion of each piece to be cut lies on each conveyor;
weighing at least the portion of each piece transported on at least one of the conveyors for determining a weight for each such portion for controlling movement and positioning of a cutting unit which is adapted for receiving the transported pieces from the conveyors and which is adapted for moving transversely relative to the direction of transport of the pieces for cutting each piece parallel to its direction of transport;
moving the cutting unit with respect to the weight determined for each piece to be cut to a position for cutting each such piece for obtaining a cut portion having a predetermined weight; and
cutting each piece for obtaining a cut portion having a predetermined weight.

28. A process according to claim 27 wherein each portion of each piece transported on each conveyor is weighed for determining a weight for each portion on each conveyor for controlling movement and positioning of the cutting unit for obtaining the cut portion having the predetermined weight.

29. A process according to claim 28 wherein each piece is weighed at least once on each conveyor and further comprising controlling movement and positioning of the cutting unit by means of a control device computer adapted for receiving weights determined for each piece and being preprogrammed for at least one product factor defining a specified weight for a specified length of the pieces to be cut for controlling movement and positioning of the cutting unit by means of calculating the weight factors with respect to the preprogrammed product factors for obtaining the cut portion having the predetermined weight.

30. A process according to claim 28 to 29 wherein at least a portion of each piece is weighed a plurality of times.

31. A process according to claim 30 further comprising separating the cut pieces into size groups.

32. A process for cutting pieces of material for obtaining a cut portion from each piece having a predetermined weight comprising:
placing and transporting pieces of material to be cut on a pair of separate adjacent parallel conveyors travelling in the same direction at substantially the same speed wherein a portion of each piece to be cut lies on each conveyor;
weighing at least the portion of each transported on at least one of the conveyors for determining a weight for each portion weighed;
moving each weighed piece, with respect to the weight determined, transversely relative to the direction of transport of the pieces for positioning each plate with respect to a cutting unit which is adapted for receiving the transported pieces from the conveyors and which is adapted for cutting each piece parallel to its direction of transport for obtaining a cut portion having a predetermined weight; and
cutting each piece for obtaining a cut portion having a predetermined weight.

33. A process according to claim 32 wherein each piece is weighed a plurality of times and each piece is moved transversely at least once for positioning each piece for cutting for obtaining the cut portion having the predetermined weight.

34. A process according to claim 32 wherein each piece after having been weighed and moved transversely at least once is cut and then a cut portion is weighed and moved transversely at least once for positioning the cut portion for further cutting for obtaining the cut portion having the predetermined weight.

35. A process according to claim 32 wherein each portion of each piece transported on each conveyor is weighed for determining a weight for each portion on each conveyor and wherein a control device computer adapted for receiving weights determined for each piece and being preprogrammed for at least one product factor defining a specified weight for a specified length of the pieces to be cut for controlling movement and positioning of the pieces transversely by means of calculating the weight factors with respect to the preprogrammed product factors for obtaining the cut portion having the predetermined weight.

36. A process according to claim 35 wherein at least a portion of each piece is weighed a plurality of times.

37. A process according to claim 35 or 36 further comprising separating the cut pieces into size groups.

* * * * *

UNITED STATES PATENT AND TRADEMARK OFFICE
CERTIFICATE OF CORRECTION

PATENT NO. : 4,868,951

DATED : September 26, 1989

INVENTOR(S) : Yngve R. AKESSON, et al.

It is certified that error appears in the above-identified patent and that said Letters Patent is hereby corrected as shown below:

Column 13, line 68 (line 8 of claim 1), insert --the-- before "other".

Column 14, line 46 (line 25 of claim 3), "weighted" should be --weighed--.

Column 14, line 47 (line 26 of claim 2), insert a comma after "positioning".

Column 14, line 67 (line 2 of claim 7), "carrying" should be --bearing--.

Column 15, line 3 (line 6 of claim 7), "position" should be --positioning--.

Column 15, line 51 (line 1 of claim 15), "1" should be --2--.

Column 16, line 6 (line 1 of claim 17), delete "wherein".

Column 16, line 18 (line 13 of claim 17), delete the second occurrence of "the".

Column 16, line 20 (line 15 of claim 17), "the" should be --each--.

Column 16, line 32 (line 1 of claim 19), "12" should be --2--.

Column 16, line 51 (line 1 of claim 21), "12" should be --2--.

UNITED STATES PATENT AND TRADEMARK OFFICE
CERTIFICATE OF CORRECTION

PATENT NO. : 4,868,951

DATED : September 26, 1989

INVENTOR(S) : Yngve R. AKESSON, et al.

It is certified that error appears in the above-identified patent and that said Letters Patent is hereby corrected as shown below:

Column 17, line 28 (line 8 of claim 27), "lines" should be --lies--.

Column 18, line 4 (line 1 of claim 30), "to" (second occurrence) should be --or--.

Column 18, line 17 (line 9 of claim 32), after "each", insert --piece--.

Signed and Sealed this

Seventh Day of August, 1990

Attest:

HARRY F. MANBECK, JR.

*Attesting Officer*  *Commissioner of Patents and Trademarks*